No. 840,187. PATENTED JAN. 1, 1907.
A. ABBOTT.
CIGARETTE PACKING MACHINE.
APPLICATION FILED APR. 29, 1901.
10 SHEETS—SHEET 2.
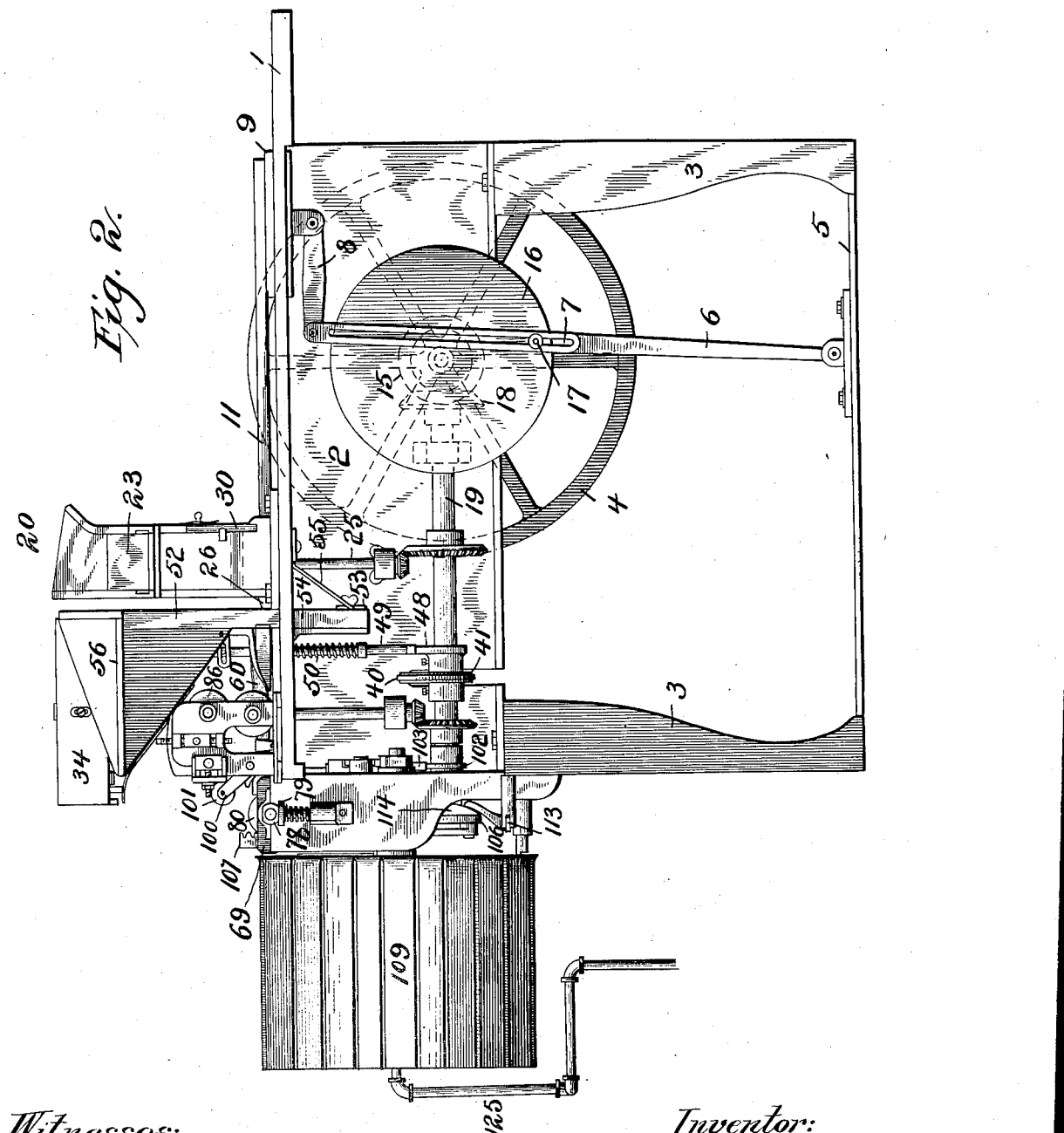
Witnesses:
R. S. Postwick
A. Williamson
Inventor:
Augustus Abbott
By J. B. McGivr.
Attorney

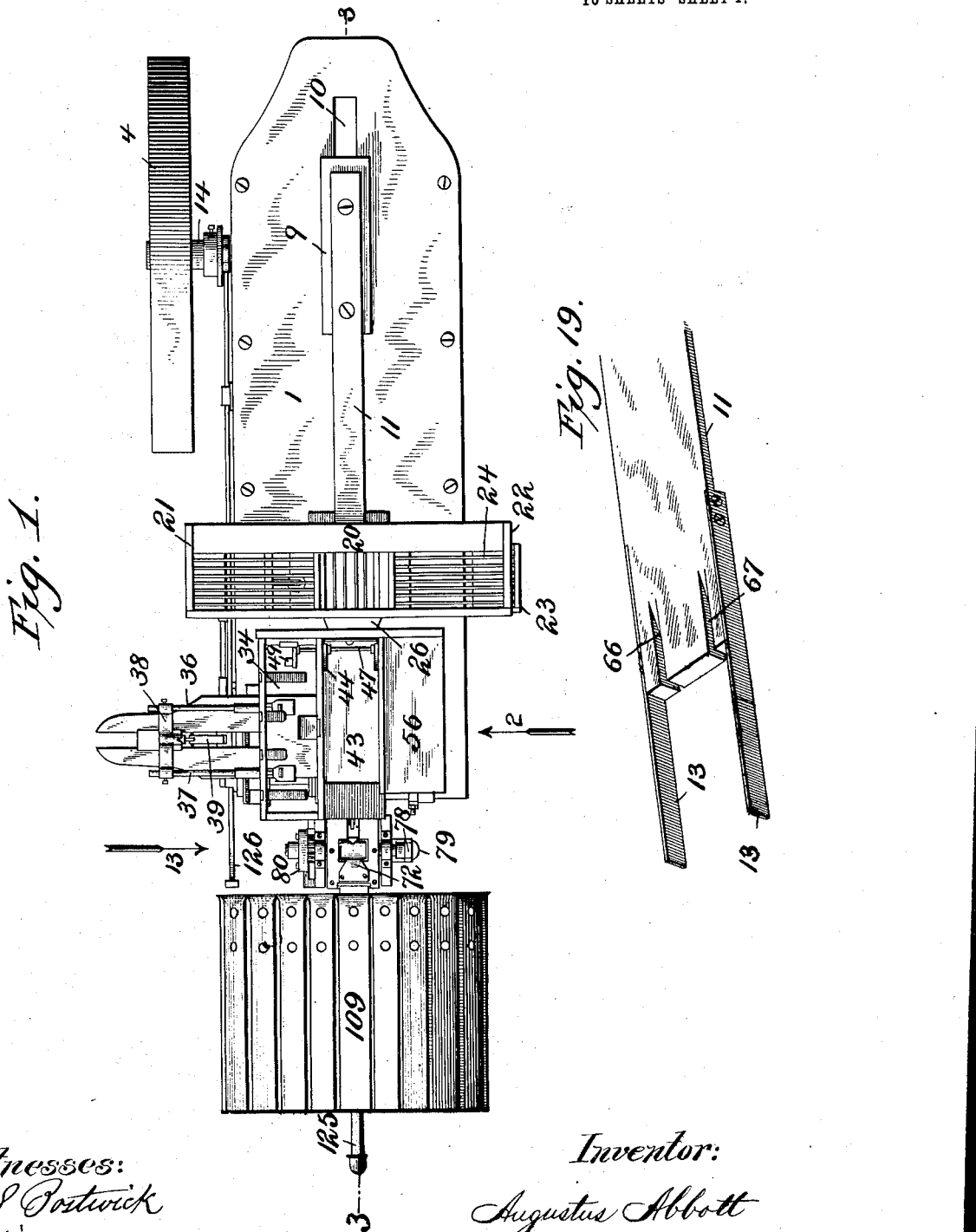

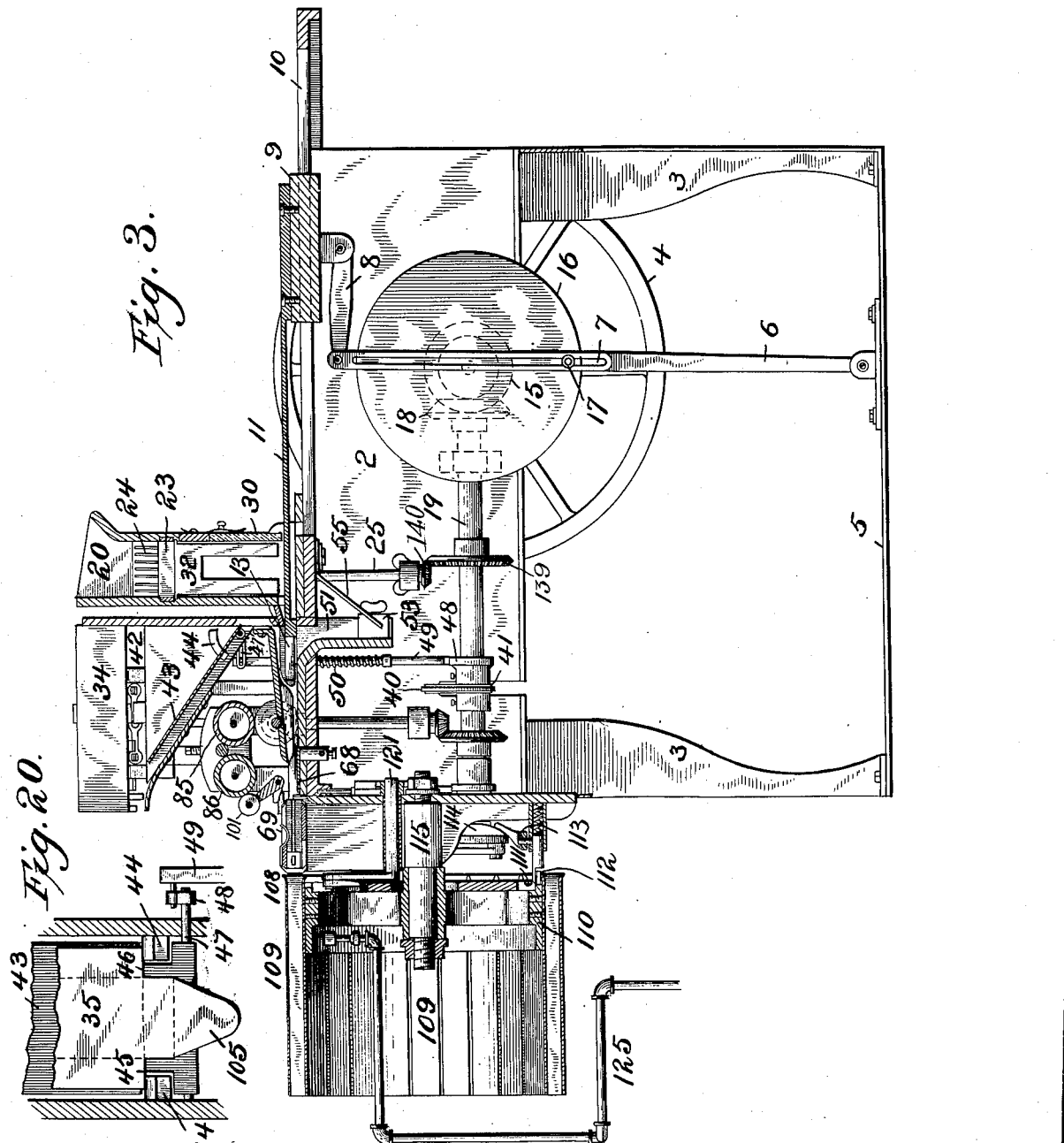

No. 840,187. PATENTED JAN. 1, 1907.
A. ABBOTT.
CIGARETTE PACKING MACHINE.
APPLICATION FILED APR. 29, 1901.
10 SHEETS—SHEET 4.
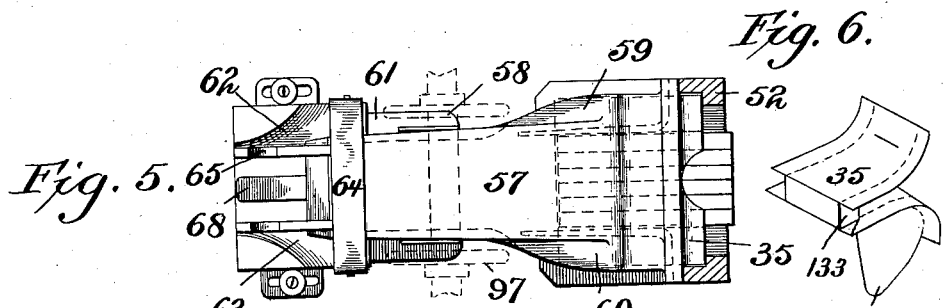
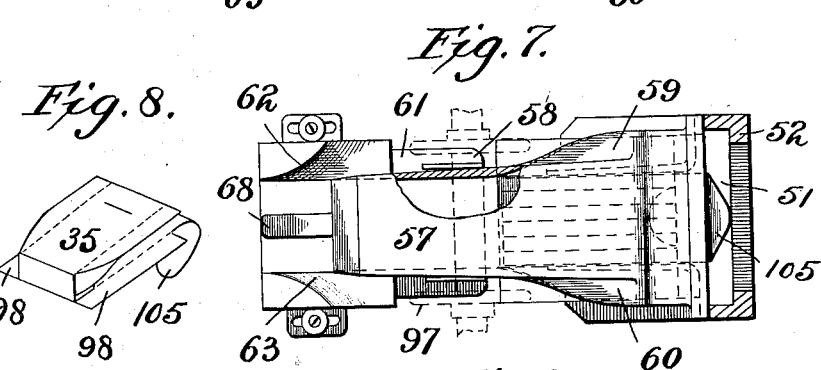
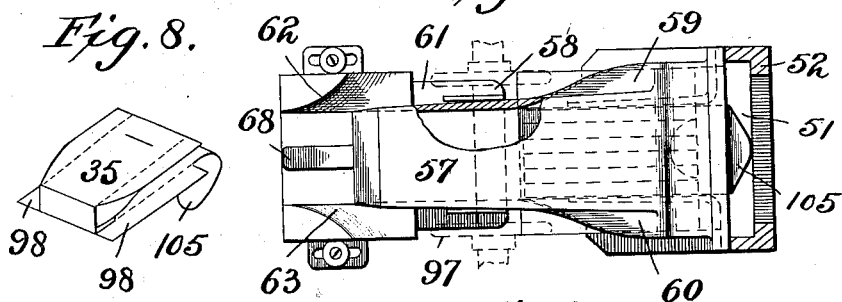
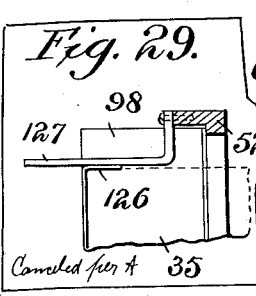
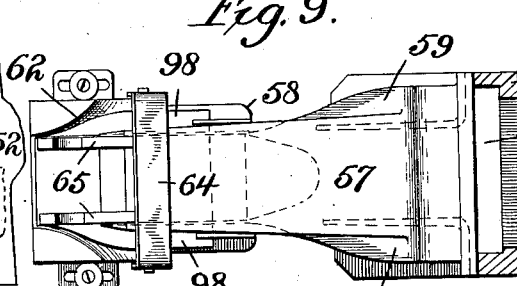
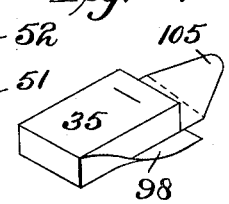
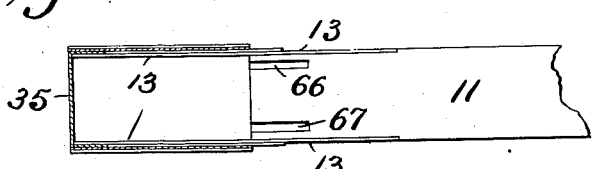
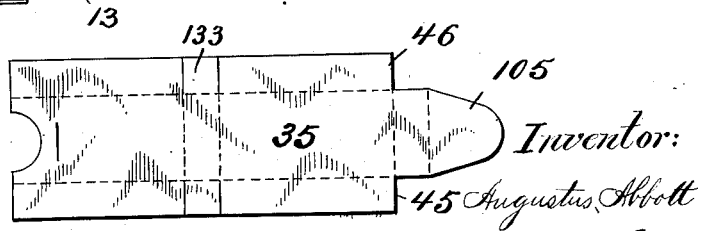
Witnesses:
R. S. Postwick
A. Williamson
Inventor:
Augustus Abbott
By J. B. McGirr.
Attorney No. 840,187. PATENTED JAN. 1, 1907.
A. ABBOTT.
CIGARETTE PACKING MACHINE.
APPLICATION FILED APR. 29, 1901.
10 SHEETS—SHEET 5.
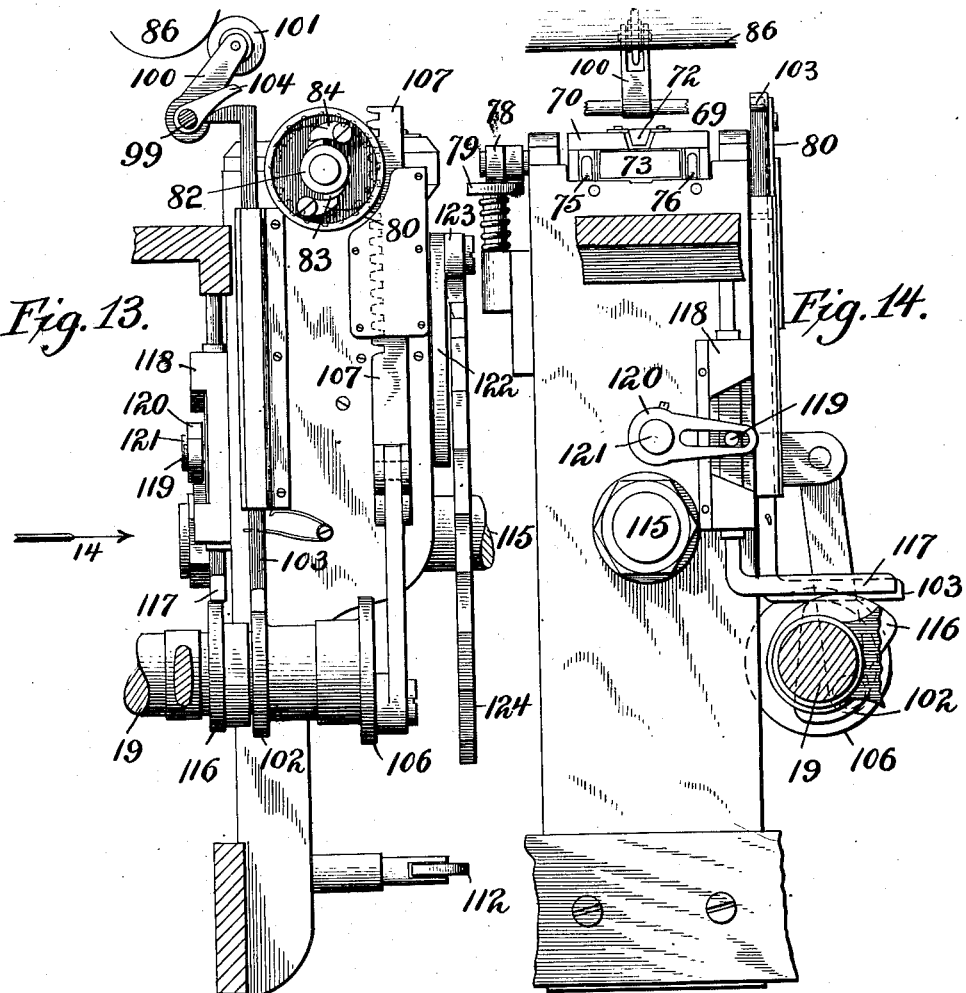
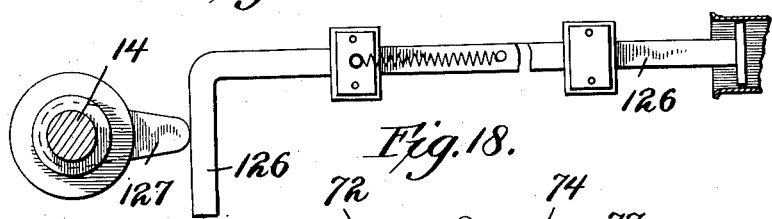

No. 840,187. PATENTED JAN. 1, 1907.
A. ABBOTT.
CIGARETTE PACKING MACHINE.
APPLICATION FILED APR. 29, 1901.

10 SHEETS—SHEET 6.

Witnesses:
R. S. Postwick
A. Williamson

Inventor:
Augustus Abbott
By J. B. McGuire
Attorney

No. 840,187. PATENTED JAN. 1, 1907.
A. ABBOTT.
CIGARETTE PACKING MACHINE.
APPLICATION FILED APR. 29, 1901.
10 SHEETS—SHEET 7.
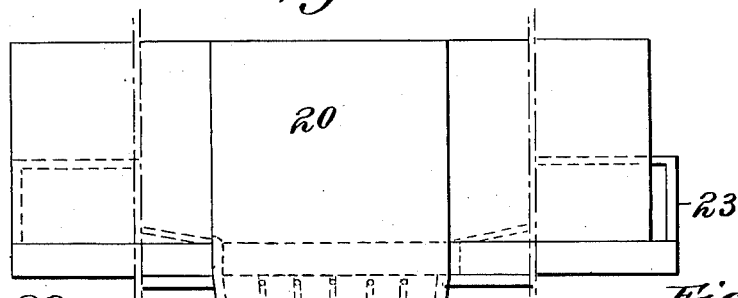
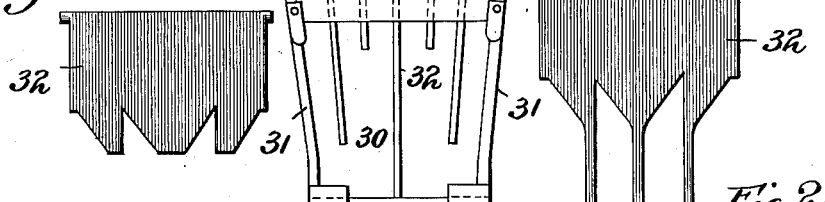
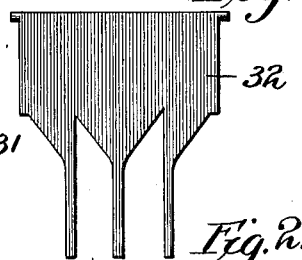
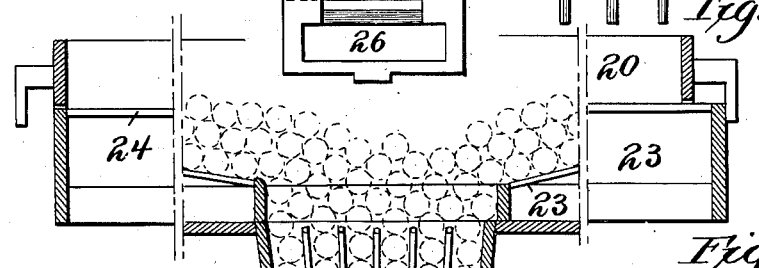
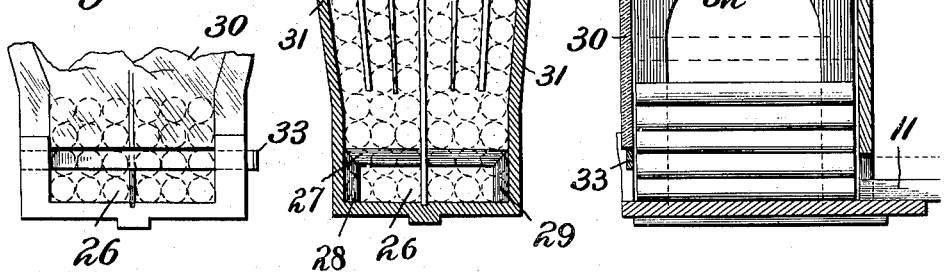
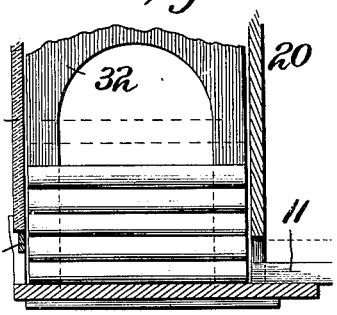
Witnesses:
Inventor:
Augustus Abbott
By J. B. McGivr.
Attorney.

No. 840,187. PATENTED JAN. 1, 1907.
A. ABBOTT.
CIGARETTE PACKING MACHINE.
APPLICATION FILED APR. 29, 1901.

10 SHEETS—SHEET 8.

Witnesses:
R. S. Postwick
A. Williamson

Inventor:
Augustus Abbott
By J. B. McGirr.
Attorney.

No. 840,187. PATENTED JAN. 1, 1907.
A. ABBOTT.
CIGARETTE PACKING MACHINE.
APPLICATION FILED APR. 29, 1901.
10 SHEETS—SHEET 9.
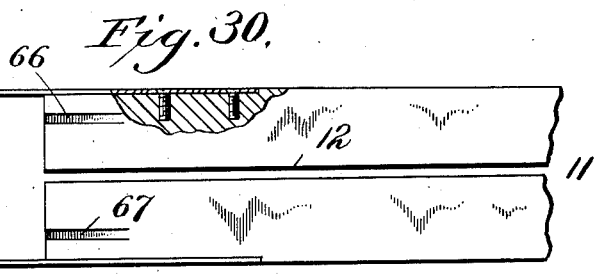
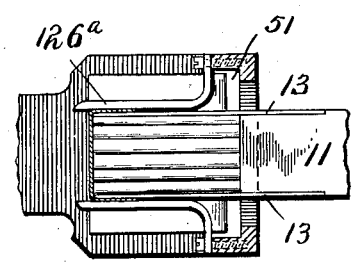
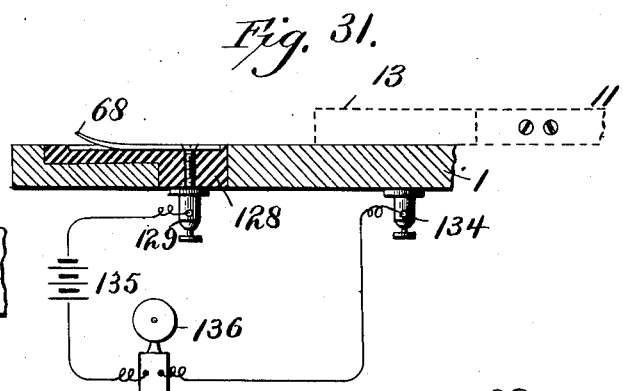
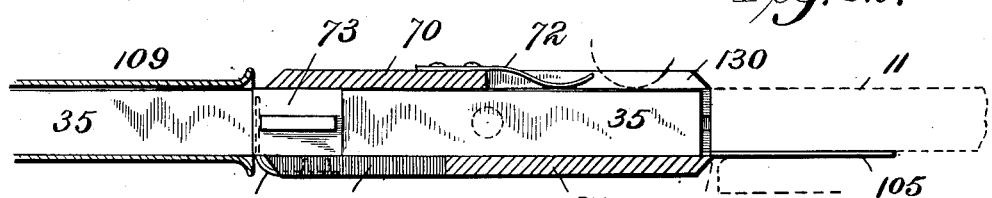
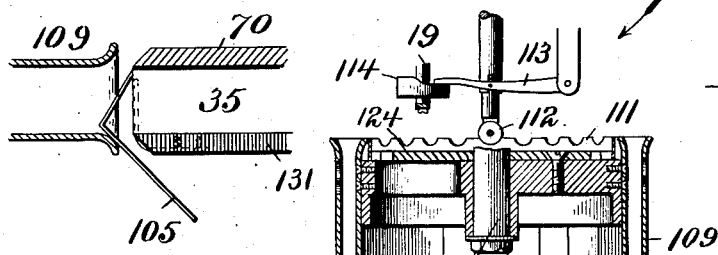
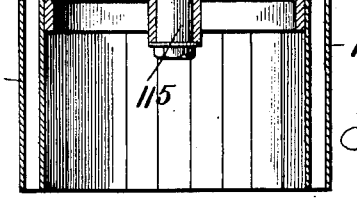
Witnesses:
Wm. J. McGinley
Alfred Williamson
Inventor
Augustus Abbott
By J. B. McGirr.
Attorney.

No. 840,187. PATENTED JAN. 1, 1907.
A. ABBOTT.
CIGARETTE PACKING MACHINE.
APPLICATION FILED APR. 29, 1901.

10 SHEETS—SHEET 10.

Witnesses:
Wm J. McGinley
Alfred Williamson

Inventor
Augustus Abbott
By J.B. McGirr.
Attorney

UNITED STATES PATENT OFFICE.

AUGUSTUS ABBOTT, OF NEW YORK, N. Y., ASSIGNOR TO AMERICAN WRAPPING AND BOX MACHINE COMPANY, OF NEW YORK, N. Y.

CIGARETTE-PACKING MACHINE.

No. 840,187.      Specification of Letters Patent.      Patented Jan. 1, 1907.

Application filed April 29, 1901. Serial No. 57,886.

*To all whom it may concern:*

Be it known that I, AUGUSTUS ABBOTT, a citizen of the United States, and a resident of New York, in the county of New York and State of New York, have invented certain new and useful Improvements in Cigarette-Packing Machines, of which the following is a specification.

My invention relates to machines which are employed in selecting a predetermined number of cigarettes from a receptacle and inclosing them in a box or package of cardboard or other material; and the object thereof is to provide an organization which is particularly simple in construction and highly efficient in operation.

My invention includes the combination and arrangement of parts to be hereinafter described, and particularly pointed out in the claims.

Figure 16:
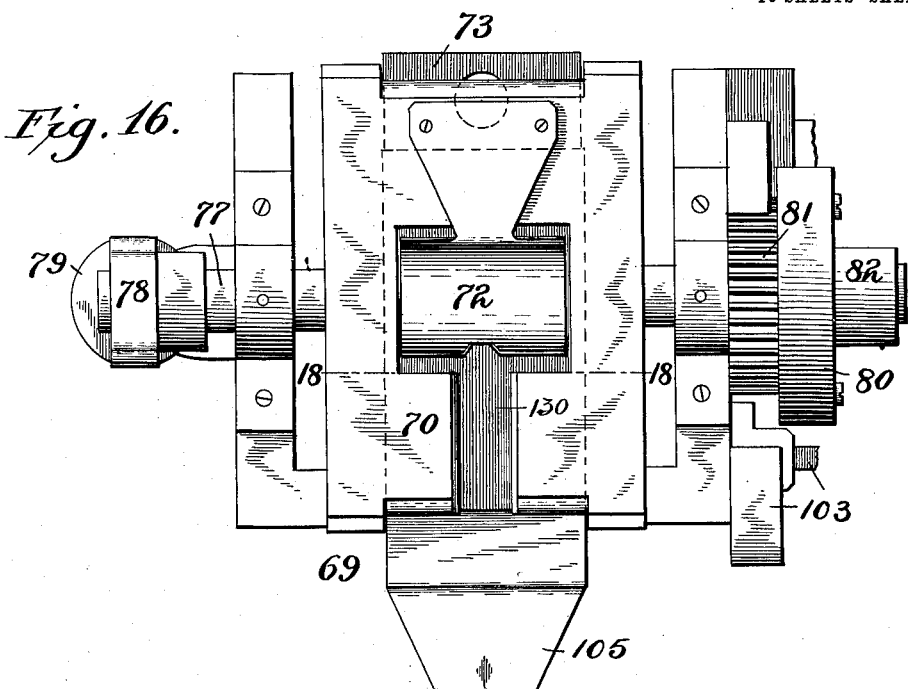
Figure 17:
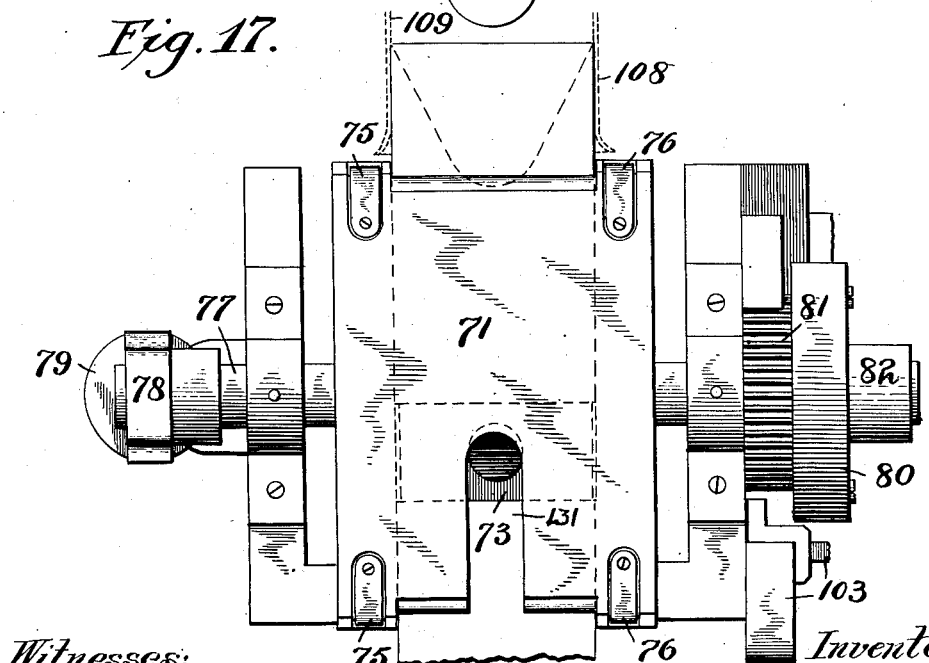
Figure 27:
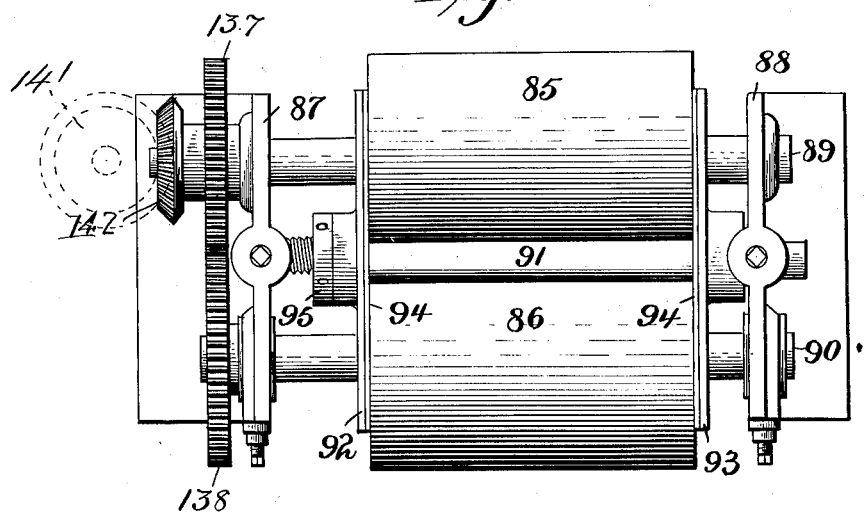
Figure 28:
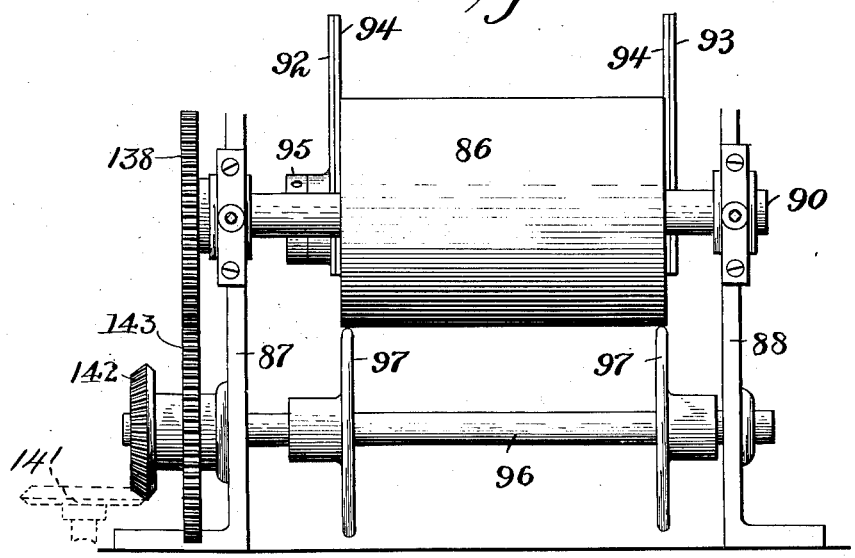
Figure 36:
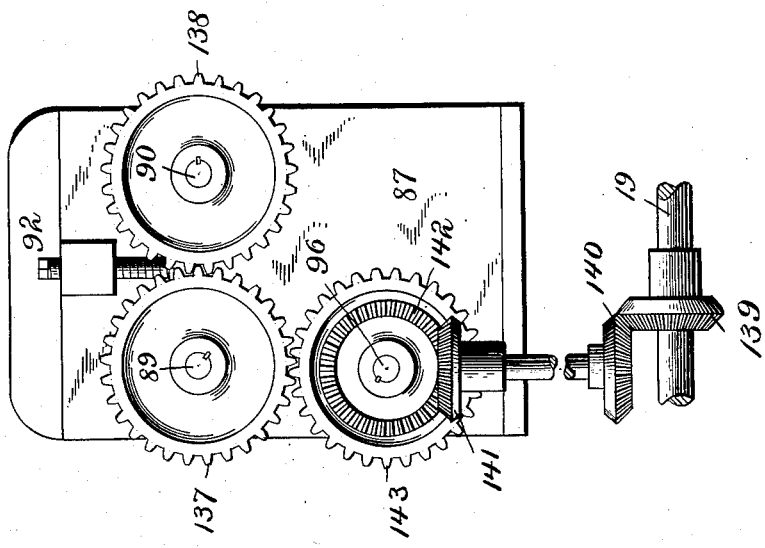
Figure 35:
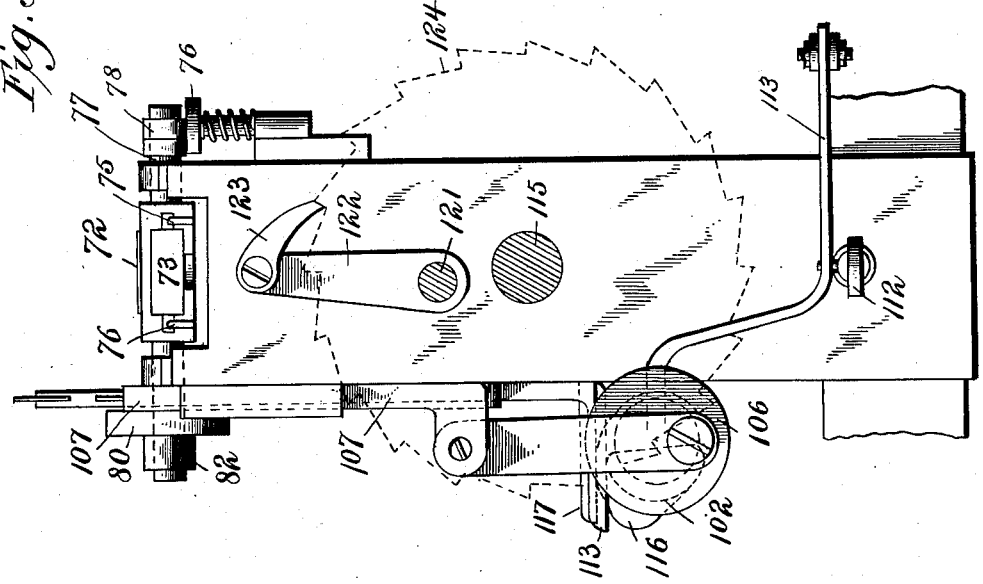

Referring to the drawings which form a part of this application, Figure 1 is a top view of the machine; Fig. 2, a side elevation looking in the direction of arrow 2, Fig. 1; Fig. 3, a longitudinal section on lines 3 3, Fig. 1; Fig. 4, a wrapper within which the cigarettes are incased. Fig. 5 is a plan view of the folding mechanism and feed-chute, the latter being shown in section. Fig. 6 is a perspective view of the partially-shaped wrapper, the same being shown to the extent it is shaped by the passage of the package through the folding mechanism as far as is indicated in Fig. 5. Fig. 7 is a view similar to Fig. 5 with parts shown broken away and the package shown further advanced than in Fig. 5. Fig. 8 is a perspective view of the package, showing the extent the same is folded when it reaches the position in the folding mechanism illustrated in Fig. 7. Fig. 9 is a view similar to Fig. 5 showing the package near the discharge end of the folding mechanism. Fig. 10 is a perspective view of the package, showing the shape thereof when it reaches the position in the folding mechanism illustrated in Fig. 9; Fig. 11, a top plan view of the plunger with a box formed about its free end; Fig. 12, a side elevation of the retaining-latch. Fig. 13 is a rear elevation of the tumble-box, (see arrow 13;) Fig. 14, a like view of the same (see arrow 14;) Fig. 15, a sectional elevation of a supplemental plunger; Figs. 16 and 17, respectively, are plan views of the tumble-box. Fig. 18 is a cross-section of the same; Fig. 19, a view of the free end of the plunger; Fig. 20, a detail showing wrapper-retaining lugs; Fig. 21, an elevation of the counter. Fig. 22 is a cross-section of the same; Figs. 23, 24, partitions for the same; Figs. 25 and 26, a modified discharge-opening for counters; Fig. 27, a plan view of pasting device; Fig. 28, an elevation of same. Fig. 29 is a plan view of the tucking-finger, showing the wrapper being formed about the cigarettes; Fig. 30, a top plan view of a modified plunger; Fig. 31, a detail diagrammatical view of the electric alarm-circuit; Fig. 32, an enlarged sectional view of the tumble-box, showing a package being introduced therein and the tumble-block discharging the preceding package; Fig. 33, a detail showing the ends of the tumble-box and one of the tubes of the drying-drum, illustrating the manner of introducing the package to the latter, by which means the end leaf is secured to the package; Fig. 34, a detail showing the releasing device for the drying-drum. Fig. 35 is an opposite view of Fig. 14, showing means for rotating the drying-drum and its coacting parts; Fig. 36, a detail elevation of the pasting device, showing the driving connections with the main longitudinal shaft.

In all the above views corresponding parts are designated by like numerals of reference throughout the various views.

1 is the table of the machine, and 2 designates the sides of the same, which have suitable standards 3 at the ends, and 4 is a fly-wheel, which may be operated by hand or driven by any approved motive power.

A bar 5 connects the standards 3 together, and suitably pivoted thereon is a lever 6, provided with a slot 7. To the upper end of the lever is a link 8, which connects with guide-block 9, operating in a slot 10. To the upper side of the guide-block is secured a reciprocating plunger 11, which is cut away on its under side to permit of as little friction as possible, while on its forward or free end is provided with parallelly-disposed longitudinally-projecting fingers 13, which are of substantially the widths of the edges of the box and serve as formers in bending the wrapper, as well as guides to hold the cigarettes in position while the wrapper is being formed about them.

The fly-wheel 4 is mounted on a short shaft 14, which has a suitable bearing (not shown) in the side 2, and its inner end has secured thereto a bevel-gear 15 and a disk 16, the outer face of which carries a pin 17, that fits and rides smoothly in the slot 7 of the lever 6. The gear 15 meshes with another suitable gear 18 on the main longitudinal shaft 19, which runs parallel with the length of the machine and drives the numerous devices at the proper speed and in unison with each other.

The hopper containing the cigarettes to be packed is designated 20. It includes sides 21 and 22 and a movable member 23, provided with suitable bars 24, over which the cigarettes are fed to the counter, the latter being given a rapid vibratory movement by an eccentric which consists of a crank secured to the upper end of the shaft 25, then by link to the movable member 23, by which means the movable member is given a reciprocating motion transversely of the machine, which causes the cigarettes to force themselves toward the center or in the space between the partitions of the counter, where they are fed as fast as they are discharged from the latter through a contracted mouth 26 on the opposite side of the counter. The mouth or opening 26 is provided with an upper wall 27, which inclines downwardly, while the side walls 28 and 29 of the same converge toward their outer ends, which compresses the cigarettes to the desired size that they are to assume in the package.

The counter, which is also shown and described in the above-mentioned application, is about the same in its construction and operation and is provided with a glass door 30, on its four sides, through which the operator may see that the cigarettes or other articles are in their proper position. The wall 31 inclines toward the center of the machine and has suitable partitions 32 therein. These partitions may be of one length, as shown in Fig. 22, or each alternate partition may be long and short, as may be desired; but it is preferable that the said partitions be suspended by trunnions 132 within the counter, so as the cigarettes when fed to the counter drop through one or the other of the passages until the throatway below and between the partitions is filled.

Referring to Figs. 21 and 22, supposing the machine is ready to be operated. cigarettes are first packed in the throatway through the glass door 30, then by dropping one after another of the cigarettes down through the several partitions until the passages are completely filled When this has been done and the hopper has been filled, the machine is started. Once this operation has been done the vibratory action of the movable member 23 will cause the cigarettes to flow in a continuous line down between the partitions, where they assume a compact mass to be discharged by the plunger on its next reciprocation.

In Figs. 25 and 26 is shown another form of a counter wherein the central partition 70 extends from the top to the base of the discharge-opening, and the plunger shown in Fig. 30 is designed more particularly to operate in conjunction with this form of counter, the slot 12 of the plunger permitting the discharge of cigarettes on each side of the central partition. To the forward face of the counter is secured a shutter 33, which permits only one row of cigarettes being discharged when such is only desired.

The partitions 32 consist of thin sheet-metal plates having suitable projections or lugs at their upper end, which act as trunnions when the partitions are in place. The object of swinging the partitions is to allow the utmost freedom of the cigarettes passing down the several passages with as little friction as possible.

To the rear of the hopper is suitably secured an automatic wrapper-discharger which consists of a receptacle 34 for holding the wrapper 35. Two longitudinal reciprocating arms 36 and 37, having discharge-fingers on their free ends, are reciprocated back and forth under the load of wrappers by a crossbar 38, which is pivotally hinged to a depending lever 39, the lower end of which is secured to an arm of the eccentric-strap 40, operated by an eccentric 41 on the main power-shaft 19. Thus for each revolution of the eccentric the fingers move forward and discharge a single wrapper from the bottom of the stack in the receptacle through the opening 42 in the side thereof, the wrapper dropping into an enlarged trough having a hinged vibrating tongue 43, on which the wrapper falls, and is held from further downward movement by reason of concentric guides 44, on which the shoulders 45 and 46 of the wrapper rest. The tongue 43 swings on a small shaft 47 by means of an arm 47', operated by a vertical rod 49. For every revolution of the cam 48 the rod 49 rocks the tongue back and forth. A spring 50 causes the return of the rod.

The wrapper when deposited on the tongue 43 is carried with it on its upward movement until it assumes a vertical position, when the shoulders 45 and 46 are pushed off the guides 44, the wrapper dropping down the slot 51 in the plate 52, where its downward movement is arrested by a block 53 on the lower end of the chute 54, which catches and holds the wrapper in position therein by the shoulders 45 and 46 until intercepted by the plunger.

The chute extends below the bed-plate and retains the wrapper securely by reason of the upper portion of the wrapper being held in the slot 51 above the bed-plate, while on the lower end it is held by the block 53 and an auxiliary spring-plate 55, which is secured to the under side of the table-top, and having its depending free end inclined into the wrapper-chute, which insures the tongue of the wrapper 35 passing down and remaining in its proper position until discharged. To the other side of the trough or mouth of the chute is arranged a place 56, on which is held a reserve supply of wrappers.

The package-forming device is similar in many respects to that filed by myself and others on August 5, 1899, Serial No. 726,289, which comprises an upper and lower plate 57 and 58, the former being the same width of the paper-slot plate 52 and having its outer edges gradually receding from the plate 52 and forming scrolls or wings 59 and 60. The under plate 58 is slightly wider to provide means whereby the edges of the lower leaf 98 of the package making contact with the paste-wheel 97, as shown in dotted lines, Fig. 7, the rear end of lower plate 58 has shoulders 61, which curve, so as to form gradual scrolls or wings 62 and 63, while to the sides of the same is secured a gravity-latch 64, having fingers 65, which as the plunger with its contents pass under the same the latch drops into recesses 66 and 67 in the plunger and retains the cigarettes in position and from displacement while the fingers 13 are being disengaged from the box.

As best shown in Fig. 29, two fingers 126ª project forwardly from the blank-chute between the plates 57 and 58 and on opposite sides of the path of movement of the plunger. These fingers are separated from each other a distance substantially equal to the width of the package and are provided with vertical faces which act as a bunch of cigarettes is fed forward with a blank to tuck inwardly the end flaps 133. These flaps are clearly shown in Figs. 4 and 6.

To the discharge end of the folding device is secured an insulated block 128, to which is secured a spring 68 by a binding-post 129, where one end of an electric wire is secured, while its other end is secured to the main frame of the machine, as shown at 134, while interposed between these two points are the battery 135 and the alarm-bell 136. As the machine is constructed of metal, it will be readily seen that should the plunger (see Fig. 31) make a discharge of cigarettes from the hopper and counter without a wrapper being in position the plunger 11 would come in direct contact with the spring 68 and cause the alarm-bell to ring, thus causing the attention of the attendant to be called to the fact that the receptacle 34 should be replenished. When the wrapper is in place, the plunger 11 causes the same to fold about the fingers 13 and its contents, and by reason of the wrapper being between the bed 1 and the spring 68 prevents the alarm-bell from sounding.

The pasting device is constructed about on the same lines described and shown in the above-mentioned applications. The two paste-cylinders 85 and 86 are mounted on suitable bearing-plates 87 and 88 on either side of the machine. The shafts 89 and 90 have gear-wheels 137 and 138, which mesh with each other and rotate the cylinders 85 and 86 in opposite directions. The shaft 96, which carries the paste-applying wheels 97, also extends beyond the side plates and has thereon a gear-wheel 143, the latter meshing with gear 137, while to the outside of the gear 143 is a bevel-gear 142, which in turn meshes with a like gear 141 on a vertical shaft, said shaft being operated by a set of gears 140 and 139 on the main longitudinal shaft 19, as shown in Fig. 36.

Secured to the plates 87 and 88 is a small rod 91, which extends close to the periphery of each cylinder, and on this rod are two plates 92 and 93, the faces of which are covered with leather 94 to prevent the paste from leaking around the ends of the cylinders. These plates 92 and 93 are held against the cylinders by a jam-nut 95. By reason of the cylinders revolving in opposite directions it causes the plastic material to always remain centrally between the cylinders, the rod 91 permitting sufficient amount of material to adhere to the cylinders to accomplish the work desired.

To the front of the pasting device are wheels 97, which apply the plastic material from the cylinder 85 to the lower leaf 98 of the package, while to the rear of the pasting device is arranged another shaft 99, having an arm 100 centrally located thereon, carrying a paste-roll 101, which is operated by an eccentric 102 on the main shaft, said eccentric operating a bar 103, which operates an arm 104 on shaft 99 and causes the paste-roll to make contact alternately with the paste-cylinder 86 and the top of the package.

In advance of the table 1 a drying-drum, to be hereinafter described, is arranged, which is provided with suitable pockets or channels to receive the packages, the walls of which serve, as will be later described, to fold down the final flap of the package, and between this drum and the table a rotatable box 69 is arranged, which receives the packages from the table, breaks down the final flap in coöperation with certain other elements, and then registers the packages with one of the aforesaid channels of the drum. The box 69 is of greater length than the packages, and it includes upper and lower walls 70 71, in which are diametrically-opposed recesses opening through opposite ends of said walls 70 71, respectively, which recesses permit of a suitable pasting-roller reaching the package held in the box 69. A suitable leaf-spring 72 is placed within one of the recesses and has an end projecting within the interior of the box 69, which exerts sufficient frictional resistance upon the package therein to prevent the accidental movement or displacement of the latter. A block 73 is retained within the box 69 and is provided with tongues or lugs 74, movable in guide-channels in the side walls o the box. This block is freely movable lengthwise of the box, but is prevented from completely passing out through the open ends of the same by means of leaf-springs secured to the ends of the box and having free portions projecting in advance of said ends and in the path of movement of said lugs 74. One of said springs is designated 75 in Fig. 32. These springs permit the end of the block when under pressure to project beyond the end of he box; but as soon as the pressure is removed the springs shift the block back into the box. As w ll be noted, the box 69 is of greater length than the packages, and the block is substantially the same length as this difference in length between said box and package. When a package is forced into the box by the plunger, the block rests behind the package previously forced into the box, the flap of which has been broken by the previous rotation of the box and is presented toward the receiving-pocket in the drying-cylinder. As the succeeding package pushes upon the block the latter in turn pushes the package in advance thereof well into the registering pocket of the drying-cylinder. In the final part of this movement the front end of the block is projected through the box against the tension of the springs bearing on the lugs 74 and enters the registering pocket of the cylinder, thereby insuring that the package is pressed well within the same, so as to be entirely out of the path of movement of the box 69 when the next rotation thereof occurs. As the plunger retracts the springs, coacting with the block, return the latter into the box, so that when the box is rotated this block will also be out of the way and the package behind the block will have the final flap thereof sufficiently projected beyond the end of the box to break said flap on the proper lines as the box rotates.

The end lap 105, as shown in Fig. 33, is left extended by the plunger 11 when the latter has deposited the package and its contents into the tumble-box 69. Then the paste-wheel 101 applies paste to the top of the box through the slots 130 and 131, when the cam 106 causes the same to turn over, as indicated, thus causing the flap to fold on its scoring-lines before being introduced to the drying-drum, as indicated in Fig. 33, which will as the package is discharged from the tumble-box 69 into the drying-drum cause the flap 105 to become firmly sealed to the body of the package and wholly obscure the contents of said package from view.

In the face-plates 70 and 71 of the box are slots 130 and 131, which permit of the paste-roll 101 placing gum or other adhesive material on the top of the box that has been placed in the tumble-box, so that when the box and its contents are turned over the portion of the package to which adhesive material is applied passes through the slot without obstruction the adhesive material may be applied direct to the end inclosing leaf 105, but it is preferable for many reasons to apply adhesive material to the top of the package and force the leaf thereon.

The tumble-box 69 is mounted on trunnions 77, and on one of the trunnions is secured a retaining-cam 78, while immediately under the same is arranged a spring-retaining plate 79, which holds the box in one or the other of its positions, while on the opposite trunnion is a hollow disk 80, loose on the trunnion and having on one side a gear-wheel 81, while the sleeve 82, which is secured to the trunnion, has two teeth 83 on its inner end. The inner face of the disk 80 carries two spring-pawls 84, through the medium of which the box is turned from one position to another. The tumble-box at this point having received the package within the same is caused to rotate by means of eccentric 106, rack 107, which then presents the end-inclosing leaf 105 to the mouth of one of the tubes or openings 108, of means made use of for drying the package which in the form of the invention shown consists of a rotatable drying-drum. This drying-drum is composed of a series of tubes 109, each capable of holding about five packages, each package entering freely through the enlarged mouth 108, where the end-inclosing leaf will as it is introduced to the mouth of the tube be pressed forward and become securely sealed to the body of the package, the gummed side of the package being the nearest to the bottom of the tube.

The inner edges of the drum 110, having indentures 111, into which fits a small spring-actuating wheel 112 when the drum is at rest, the wheel holding one of the tubes in alinement with the throatway or opening in the tumble-box 69, the wheel can be automatic in its action on the drum; but it is preferable to have a lever 113, suitably pivoted in the rear to release the wheel from the recess 111 at the proper time by means of a cam 114 on the rear face of the disk 106. Thus for each revolution of the shaft 19 the drum will be allowed to advance about the shaft 115 until the next succeeding tube is in alinement with the tumble-box.

To the shaft 19 is suitably secured a cam 116, which in turn operates a bar 117 within bearings 118, said bar having a pin 119 extending therefrom, which engages a slotted lever 120 on a shaft 121, extending through the front side, where it has secured thereto another arm 122, the free end of which carries a pawl 123, which engages with a ratchet-wheel 124 on the drying-drum 110. Each action of the cam advances the drum one tube.

A gas-jet 125 is provided at the end of the machine, which is kept lighted while the machine is in operation and heats the drum and its series of tubes to such a temperature as to completely dry the gummed portion of the package before it reaches the opposite end of the tube in which it was deposited.

The drum 110 by reason of its connections with the main operating-shaft advances one tube for each package that is delivered to the same. Thus as the drum advances around about one-third of its travel a subsidiary plunger 126 is operated upon by an eccentric 127 on the shaft 14, thus causing the package to be pushed a short distance from the front or mouth of the drum, so that when the tube 109 arrives again in alinement with the tumble-box 69 the package will have no resistance on entering the same. The drum will receive about one hundred and twenty packages before it discharges the first package deposited, the same being pushed rearward by the next succeeding package that is introduced.

It is understood that various modifications of the machine can be made by those skilled in the art without departing from the spirit and scope of the invention.

What I claim is—

1. In a packaging-machine, the combination, with a support, a receptacle for cigarettes arranged above the support and provided with a discharge-opening, a plunger reciprocating through said opening and operating to discharge cigarettes therefrom, and means for feeding an inclosing wrapper across the path of movement of the cigarettes as they are removed from the receptacle and folding it over their front ends, of folding means on opposite sides of the path of travel of the plunger for folding the edges of one portion of the wrapper against and along the sides of the mass of cigarettes as it is carried past them by the plunger, means for applying paste to the edges of the unfolded portion of the wrapper, and for folding them against the edges of the folded portion thereof, to complete the folding of the wrapper around the sides of the mass, a tumble-box having a channel in line with the plunger to receive the package at the end of the plunger movement, means for rotating the tumble-box, a receptacle for receiving the package, and means in addition to the plunger and operating under the influence thereof through which the transference of the package from the tumble-box to the receptacle is accomplished.

2. In a packaging-machine, the combination, with mechanism for moving a body of cigarettes in a given direction, means for feeding an inclosing wrapper in the direction of its length across the path of movement of the cigarettes and thereby folding it over their forward ends, folding devices arranged in relation to the cigarette-moving mechanism for folding the wrapper around the sides of the body of cigarettes as the latter is carried by them in moving in the given direction, a tumble-box to receive the package after passing the folding devices, and means for applying paste whereby the rear end flap of the wrapper is secured down upon the package, of means for rotating the tumble-box for folding the rear end flap of the wrapper upon the package, devices for coöperating with the tumble-box in effecting this folding operation, a tumble-block movable within the tumble-box, and a receptacle for receiving the package as it is transferred to it from the tumble-box by the cigarette-moving mechanism.

3. In a packaging-machine, the combination, with mechanism for moving a body of cigarettes in a given direction, means for feeding an inclosing wrapper in the direction of its length across the path of movement of the cigarettes and thereby folding it over their forward ends, folding devices arranged in relation to the cigarette-moving mechanism for folding the wrapper around the sides of the cigarettes as the latter is carried by them in moving in the given direction, a tumble-box to receive the package after passing the folding devices, means for applying paste whereby the rear flap of the wrapper may be secured upon the package after having been folded over upon the same, means for rotating the tumble-box to thereby fold the rear end flap of the wrapper upon the package, and devices for coöperating with the tumble-box in effecting this folding operation, of a tumble-block movable longitudinally within the tumble-box, a receptacle for receiving the package as such package is transferred to it from the tumble-box by the cigarette-moving mechanism, and means for drying the package within such receptacle.

4. The combination with a pivoted tumble-box constructed with a package-receiving orifice extending longitudinally through the same, and provided with slots 130, 131, formed in the opposite sides of the same, means for intermittingly rotating such box, a tumble-block arranged within the tumble-box, to be moved back and forth therein by the action of the cigarette-packages, and a friction-spring for controlling the movement of said block and packages, of the paste-roll 101 and means for rocking such roll for bringing it in contact with the package through the appropriate slots 130 or 131, and carrying it therefrom, all substantially as and for the purposes set forth.

5. The combination, with a plunger, and means for reciprocating the same, of a chute for presenting wrappers one at a time across the path of movement of the plunger, plates 57 and 58 projecting laterally from the front wall of the chute above and below the path of movement of the plunger respectively, with the plate 57 provided with downwardly-extending folders 59 and 60 and the plate 58 similarly provided with upwardly-extending folders 62 and 63, and tucking-fingers 126ᵃ disposed on opposite sides of the path of movement of the plunger, whereby as a mass of cigarettes or other articles is carried forward by the plunger the wrapper is folded over its forward end and the edges of the respective top and bottom flaps thereof folded downwardly and upwardly along the edges of the mass respectively, substantially as described.

6. The combination, with a tumble-box mounted on a transverse axis, a reciprocating plunger for coöperating therewith, and the machine-table, of means for both rotating the tumble-box intermittingly through a partial rotation and for locking it in the different positions to which it may be rotated, and a spring 72 arranged to bear upon the package within the tumble-box, substantially as described.

7. The combination, with the tumble-box 69 mounted on a transverse axis, the block 73 movably arranged within the same, and means for both rotating the tumble-box intermittingly through a partial rotation and for locking it in the different positions to which it may be thus rotated, of a spring 72 arranged to bear upon the package to hold it in the tumble-box, substantially as described.

8. The combination, with the tumble-box 69, provided with springs 75 and 76 at its opposite ends, the tumble-block 73 movably arranged within the tumble-box, and means for both rotating such box intermittingly through a partial rotation and locking it in the different positions to which it may be thus rotated, and a spring 72 arranged to bear upon the package within the tumble-box, substantially as described.

9. The combination, with the tumble-box 69 provided with trunnions upon which it is mounted, a sleeve 82 fixedly secured to one of said trunnions and provided with ratchet-teeth 83, and a rotating shaft, of a hollow disk 80 loosely mounted on said trunnion in close relationship to the sleeve and provided with spring-pawls on its inner face, and with a gear-wheel 81 on one of its sides, a rack 107 for engagement with such gear-wheel, a cam for imparting a reciprocating motion to said rack, a returning-cam 78 fixedly secured to the other trunnion thereof and provided with flattened surfaces, a spring-operated plate 79 for coöperating with these flattened surfaces, whereby the intermittent rotation of the tumble-box is effected and the retaining of the same in the positions to which it may be rotated accomplished, substantially as described.

10. The combination, with a tumble-box mounted on a transverse axis and having a channel-way extending through it, the machine-table, and a drying-drum having a series of package-receiving tubes disposed around its outer edge with a ring secured to its end that is provided with a series of indentations, of mechanism for intermittingly rotating such drying-drum, and restraining means for engaging with such indentations, substantially as described.

11. The combination, with a rotating tumble-box, mechanism for delivering inclosed packages of cigarettes thereto and for removing them therefrom, a drying-drum 110 having a ring secured to its end and provided with a series of indentations 111, means for intermittingly rotating said drying-drum, a rotating shaft 19, and a cam 114 thereon, of a wheel 112 for engaging with the indentations 111, and a lever 113 upon which the wheel 112 is supported, whereby the drying-drum is intermittingly rotated and the wheel 112 removed from and allowed to return into engagement with such indentations, substantially as described.

12. The combination, with a rotating tumble-box, mechanism for delivering inclosed packages of cigarettes thereto and for removing them therefrom, a drying-drum 110 having a series of package-receiving tubes 109 around its outer edge, means for intermittingly rotating said drying-drum, a rotating shaft, and a cam 127 thereon, of a plunger 126 adapted to enter the receiving-tubes 109 as they are successively brought opposite to it, and a coöperating spring, whereby as the successive receiving-tubes are brought opposite to the plunger in the rotation of the drying-drum the packages contained in them are forced inward by it from the ends of the tubes, substantially as described.

13. In a packaging-machine, blank-feeding mechanism, article-feeding mechanism, blank-folding mechanism, and a receiving-drum having a plurality of receiving-pockets, means for heating the drum, means for rotating the drum for successively registering the pockets with the feeding mechanism, and additional means for advancing the packages in the pockets of the drum, substantially as described.

14. The combination, with wrapper-feeding devices having a receiving-trough and a delivery-chute, and a reciprocating plunger, of a tongue pivotally arranged within the trough of the feeding devices, means for arresting the movement of the wrapper in said trough and at the lower end of the chute, and means for imparting a vibrating movement to the tongue within the trough, whereby the wrappers as successively selected are transferred to the chute and there held in proper position to be struck and folded over upon the articles to be wrapped as they are carried forward by the plunger in its reciprocation, substantially as described.

Signed at New York, in the county of New York and State of New York, this 7th day of March, A. D. 1901.

AUGUSTUS ABBOTT.

Witnesses:
A. L. MAYNES,
J. B. McGIRR.